Aug. 11, 1970　　　W. J. O'NEILLY　　　3,523,327
POWER DRIVEN SUSPENDED RECIPROCATING SAW INSTALLATION
Filed March 22, 1968
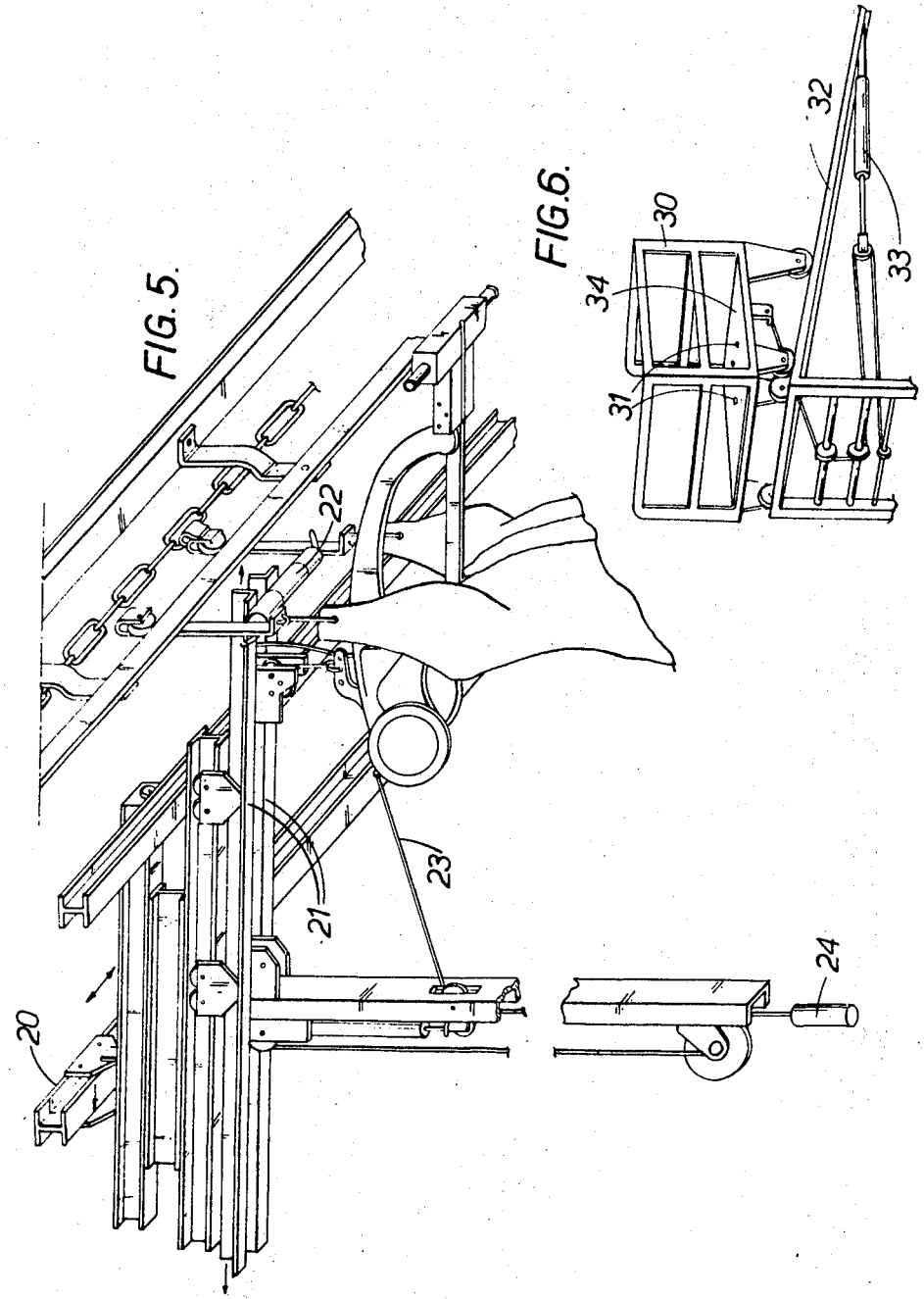

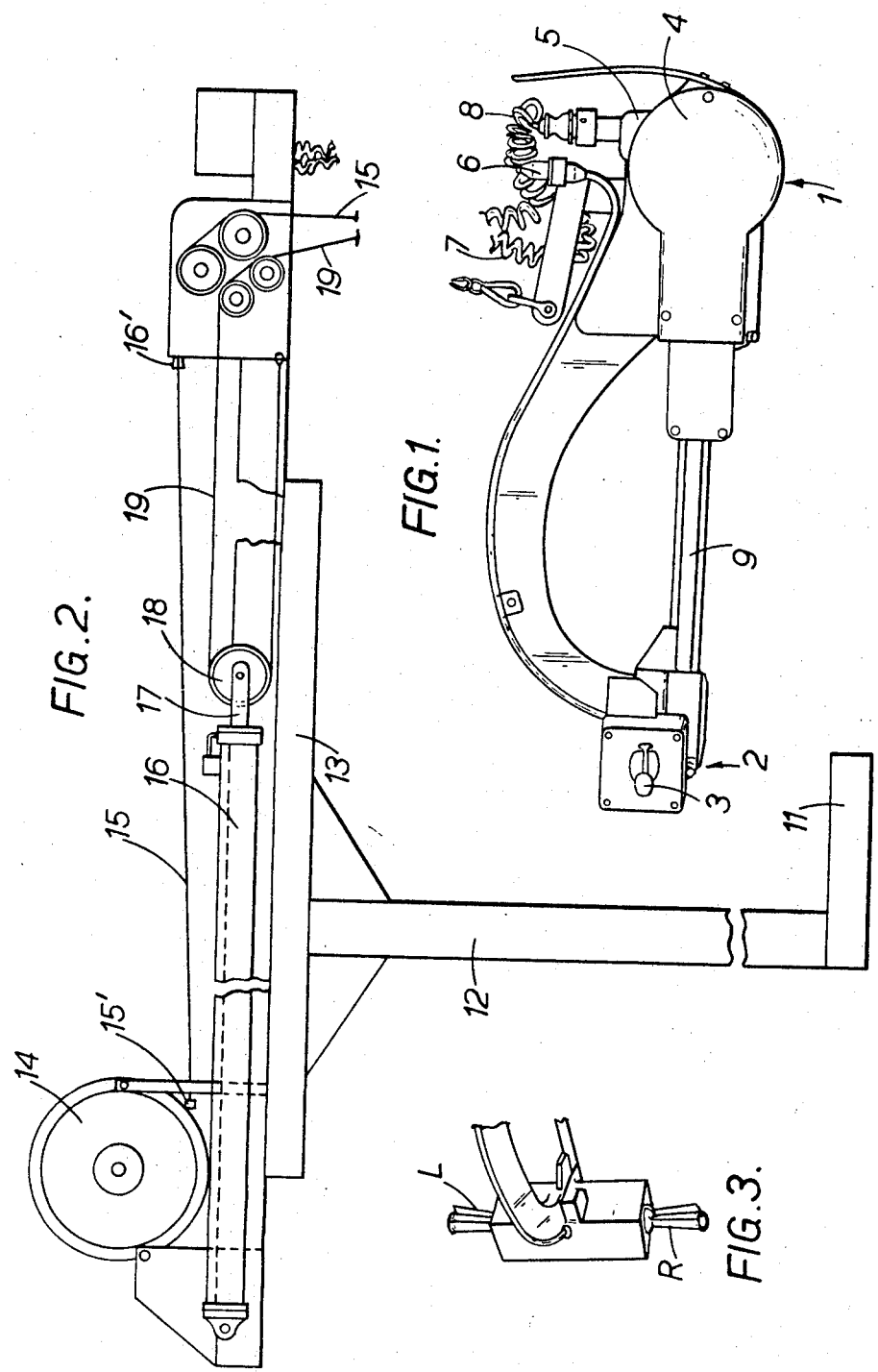

3,523,327
POWER DRIVEN SUSPENDED RECIPROCATING SAW INSTALLATION

William J. O'Neilly, Weybridge, England, assignor to Flaymasters Limited, Weybridge, Surrey, England, a British company
Filed Mar. 22, 1968, Ser. No. 715,317
Int. Cl. A22b 5/20
U.S. Cl. 17—23                              12 Claims

ABSTRACT OF THE DISCLOSURE

This invention provides an improved form of saw by means of which carcasses may be split in abattoirs. The saw is moveable vertically and normally splits the carcass as it moves downwardly and is then returned to its upper position to operate on the next carcass. The saw is held by the operator with the blade in a substantially horizontal position and the blade reciprocates towards and away from the operator. The operator stands at the light end of the saw and controls the operations by hand controls on a crossbar at the light end. The saw is suspended at its heavy end from an overhead framework.

---

This invention relates to the provision of a power driven reciprocating carcass splitter, hereinafter simply called a saw, which is specially adapted for cutting and splitting carcasses of beef, pigs, sheep and other animals in abattoirs.

At one time carcass splitting was usually done either by a hand cleaver or hand saw. More recently powered carcass splitting saws have been proposed and these saws are usually suspended by means of a cable connected to a fixed balance weight. These known saws include an electric motor and various controls including a handle to enable the operator to guide the saw, the handle and the other controls always being at the heavy end of the saw where the motor is housed. These known saws have been successful but since the introduction of what is called the "on the line" system of slaughtering difficulties have been encountered. In the "on the line" system carcasses are dressed whilst being suspended by their hind shanks and moved along a conveyor passing in front of manned working stations along the line at which each operator deals repeatedly with a particular operation, e.g., dehiding of the carcasses with a mechanical dehider assisted by a mechanical hide and skin puller. This system of operation has raised the speed at which carcasses can be dealt with and it has become clear that the method of splitting the carcasses must be speeded up to cope with the ever increasing rate of kill which in many plants has reached 120 carcasses per hour and is still increasing.

In many cases, in order to maintain an even flow rate lower than that mentioned along the line as many as three powered saws ad three operators have to be used, the operators being stationed along the line so that in turn each of the manned saws split about one third of each carcass. That known method is wasteful both in labour and machinery and the end product leaves a lot to be desired. Far better results are obtained if this task is commenced and finished by the same operator and powered splitter but with known equipment that is not possible.

The chief object of the present invention is therefore to provide an improved power driven reciprocating carcass splitter or saw so that one operator can completely split each carcass and still can keep up with the rate of movement of the conveyor.

According to the present invention there is provided a power driven reciprocating saw in which cutting is effected as the saw is moved in a vertical plane wherein the saw has a blade mounted in a saw frame and is fully mechanized and controllable by the operator from the light end of the saw, control means being provided at the light end for control by the operator.

In more detail we provide a power driven reciprocating saw in which cutting is effected as the saw moves downwardly wherein means is provided for the guidance and control of the saw at the light end and wherein upward movement of the saw is balanced by means of an adjustable counter weight or spring with assistance from a pneumatic or like cylinder. With our new saw the return movement to the top position is effected quickly, smoothly and substantially without effort on the part of the operator since all the operator has to do is to operate a control lever at the light end of the saw, and the upward movement is then effected automatically.

The speed of the downward movement of the saw is controlled by the pneumatic or like cylinder which may be provided with an adjustable bleed valve which can be preset to give a desired rate of downward movement of the saw, the bleed valve preferably being opened and closed by a solenoid valve controlled by the operator. The weight applied to the bone of the carcass by the saw is also substantilally infinitely variable using the mechanical weight ratio balance which automatically induces the effort to be drawn in the correct proportion from counter weight or springs. All the controls are preferably disposed on a handlebar which extends substantially at right angles from the body of the saw at the light end, the arrangement being such that the handlebar projects outwardly at both sides of the saw. In addition to housing all the easily accessible electromechanical controls the handlebar gives the operator a much greater and more effortless control of the powered saw especially when guiding it on its downward movement through the centre of the backbone of the carcass than has been the case heretofore.

In operation the saw can, for example be raised at a predetermined speed by pressing a hand lever control on the right side of the saw and cutting can be effected by initiating downward movement of the saw by pressing a push button on the right and by pressing a lever on the left side of the saw to start the saw blade.

Upward movement of the saw, which is merely a return movement, should be at a higher speed than the downward movement, so that extra time can be given to allow the operator to feed the blade of the saw into the bone of the carcass and all the operator's concentration can be directed to guiding the saw blade along the correct path so that the back bone of the carcass is split more or less at the centre of each vertebrae which is a feat very difficult if not impossible to accomplish with known saws and certainly not at the rate we desire our new saw to operate since we believe that an experienced operator using our new saw in accordance with this invention will be able to deal with a flow rate of 100 to 125 beef cattle per hour and up to 450 hogs per hour.

We have therefore provided a power driven saw or carcass parting device, fully mechanized and controllable by the operator to suit all systems of carcass dressing including what is called "on the line dressing."

If desired the downward cutting movement may be reversed to provide an upward cutting movement instead. It is also an important feature of the invention that the means of powering the saw blade for reciprocating movement is preferably disposed at the opposite end of the saw as compared with the controls for operation by the operator.

The carcass splitting saw is preferably suspended by three cables two for rise and fall control of the saw and one as a safety follower cable which comes into action on failure of either of the other two to prevent an uncontrolled fall of the saw. The whole assembly may include a framework with a base, pillar and crossbar on which a balancer spring and adjustable power operated hoisting arrangement is disposed on the framework. The frame supporting the balancer, piston and pulleys can be made to slide backwards, forwards and sideways so that the saw it supports can be placed properly over the aitchbone of the carcass by manual or powered means. To achieve this the portion of the frame supporting the cables on which the saw is suspended in operation protrudes over the aitchbone of the carcass and may be provided with a powered, e.g., pneumatic spreader which when the saw is positioned over the aitchbone comes into action and spreads the hind shanks of the carcass to facilitate parting them and also acts as a carrier for the entire suspension device to allow it to travel parallel with the moving line on which the carcass is suspended. In addition there may be a powered mobile platform on which the operator stands which is synchronised with the speed of the line on which the carcass is suspended. The platform is provided with suitable remote control switches, which may be foot operated, which the operator can control to regulate the forward and backward movement of the frame and the opening and closing of the hind leg spreader which is preferably fixed to a suspension arm projecting from the frame from which the arm suspends. The platform is arranged to move parallel and in unison with the line carrying the carcasses and gradually lowers itself to the floor level after which the platform is then made to return to its starting position at a much higher speed by a separate piston preferably disposed under the platform and controlled by the foot of the operator and the cycle is repeated.

In order that the invention may be more clearly understood and readily carried into effect reference is now directed to the accompanying drawings in which:

FIG. 1 is a side view of a saw in accordance with the invention;

FIG. 2 is a view of a sawing installation including a supporting framework for the saw; and FIG. 3 is a detail view.

FIG. 5 is a detail view showing adjusting means for the apparatus and

FIG. 6 shows a mobile platform.

Figure 4:
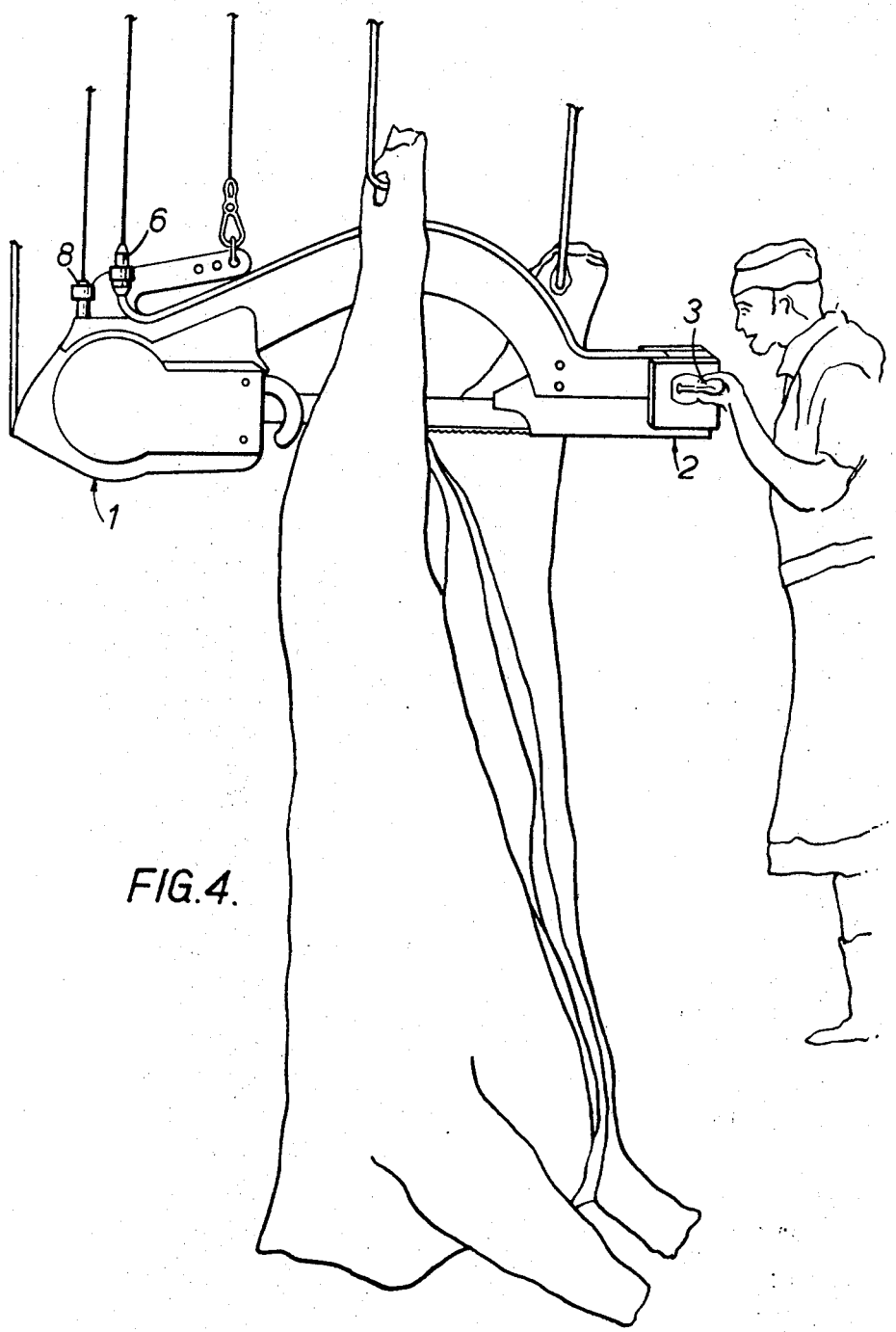
FIG. 4 illustrates the way in which the apparatus is used.

Referring first to FIG. 1 the saw comprises a heavy end 1 and a light end 2. The light end has grip means 3 in the form of a handle bar whereby the operator can control the saw and the heavy end has an electric motor, e.g., of adequate horsepower which is disposed at the rear of the casing 4 and connectors 5 and 6 for electric leads 7 and 8. One of the leads, e.g., 8 is taken to the electric motor and the other lead, e.g., 7 is taken to controls which are housed in the handlebar 3. The handlebar 3 preferably comprises a bar which extends across the light end 2 of the saw and which projects at each side so that the projections can be held by the operator. Each projection includes a grip switch one to operate saw return mechanism which will be described later in more detail and the other to initiate downward movement of the saw. An on/off switch is also provided to control the electric motor.

The saw has a blade 9 which may be of conventional construction but we prefer to use a blade with teeth or serrations on both sides. In operation cutting is effected by half the length of one side of a blade. Therefore with a blade with teeth on both sides we can by changing the position of the blade three times cut four times as many carcasses before the blade needs resharpening as we could if we used a blade that could have only one position.

The saw is suspended at the heavy end by a steel or like cable from a balance weight (not shown) and a power operated hoist which may be electric, hydraulic or air operated.

Cutting is effected by moving the saw downwards through the carcass or other work piece while the blade 9 is being reciprocated. The operator does not have to press down on the saw, all he has to do is to guide it, the pressure necessary being applied by the weight of the heavy end of the saw. Generally speaking the heavy end of the saw would apply much too much pressure if it were not modified in some way and the saw would be very unwieldly and therefore an adjustable balancer or counterweight preferably a balancer in the form of a spring is provided so that a controlled amount of pressure may be applied.

As described above a power operated hoist is provided to assist in returning the saw to its upper position after cutting and this is preferably in the form of a pneumatic cylinder and piston arrangement the piston being connected to the saw so that when pressure is applied to the piston the saw is raised, the arrangement being such that the compressed air is allowed to leak away during the downward movement of the saw.

Preferably, the balancer or counterweight system and the hoist are disposed in a supporting framework above the saw and from which the saw is suspended, the framework having a horizontal base, a vertical pillar and a horizontal crossbar. The balancer or counterweight and the hoist may be disposed either on the cross bar or on the pillar as desired. One such arrangement will now be described in more detail with reference to FIG. 2.

The framework illustrated in FIG. 2 has a base 11, a vertical pillar 12 and a cross bar 13. When operating the saw the operator stands between the pillar 12 and the saw with this back to the pillar. The crossbar 13 supports a spring balancer 14 connected by means of a cable 15 to the heavy end of the saw, a stop 15' preferably of rubber or plastics material being provided on the cable 15 to prevent the saw being raised too high or lowered too low. When the saw has reached the top of its movement the stop 15' abuts against the balancer casing and when the saw has reached the bottom of its movement the stop 15' abuts against a projection 16'. The cable 15 is preferably a steel cable which is arranged to take the selected load of the saw by means of the spring balancer 14.

In addition the crossbar supports a cylinder 16 within which is slidable piston is disposed having a connecting rod 17 connected to a pulley 18 around which is extended a cable 19 taking the selected ratio of balance of the saw load, the cables 15 and 19 being connected to the saw at the heavy end as illustrated.

FIG. 3 illustrates the light end of the saw in perspective showing the handlebar with the grip switches. The left-hand side L has a grip switch with a lever connected to a microswitch to start the action of the saw blade and to stop it and the right-hand side R has a grip switch with a lever connected to a microswitch and solenoid controlled air intake to raise the saw. When the lever at the right-hand side is released a bleeder valve takes control of the saw and allows it to descend at a steady selected rate until the stop 15' abuts against the member 16'.

Our new saw is therefore readily adjustable to give a required rate of rise and fall of the saw. For example the balancer can be set to raise the saw 4½ feet per second and to fall the same distance in 3 seconds or at any predetermined set steady rate of descent. With a weight ratio on the blade of between a few ounces to 60 or 70 lbs., all that is needed to control the saw is to operate the controls on the handlebar—one lever on the right to make the saw rise, one press button on the same side that will start the descent of the saw at a set speed and on the left-hand side another lever to start the blade oscillating to and fro and to stop it.

One advantage of our saw or splitter is that beef carcacces which are now split from the back, can with our saw be split from the belly side from which the vertebrae of the backbone are visible. At the moment, as all saws have the controlling handles on the motor housing of the splitting saw at the heavy end, the operator has to make a mark with a knife along the back of the carcass purporting to be approximately, very approximately as a matter of fact, the middle of the vertebrae and then follows this line with the blade of the splitter. By our method of having the handlebar on the frame at the opposite side of the motor that is at the light end, by making an extension to the frame and fastening the control handlebar to the extension, we can split beef carcasses from the belly side so that the operator can actually follow the middle of the naked vertebrae.

Another important advantage is that this avoids making bone dust or splinters because the weight of the splitter forcing the blade in the centre of the vertebrae splits each vertebrae in half as it does with the vertebrae of hogs when split from the belly side of the carcass. This alone is a very important factor as bone dust causes premature putrefaction and it is practically impossible to get rid of this bone dust once it falls on the meat and induces putrefaction and smell in a matter of hours depending on the temperature in which the carcass is kept. Once putrefaction begins it cannot be stopped by chilling, only by hard freezing, but will start again at the stage it was as soon as the temperature rises. This is why with prime beef cattle or hogs and cleaving is with existing equipment preferred to sawing. However, our power splitter with its powered balancer splits all carcasses better than can be done with a hand cleaver in one-tenth of the time and without human effort.

In FIG. 5 a suspension frame is illustrated comprising a frame 20 movable in either direction at substantially 90° to the length of the saw—that is t say parallel to the line of movement of the carcasses, a pair of projecting arms 21 which are movable backwards and forwards, that is to say at right angles to the line of movement of the carcasses, and a spreader mechanism 22 adapted to open out the shanks of the carcass. An extra safety cable 23 is illustrated in FIG. 5 which is operable by means of a weight 24 to keep the saw in alignment when it is withdrawn behind a carcass and made to slide back parallel with the cable 23 to position itself behind and ready to enter the next carcass.

FIG. 6 illustrates a mobile platform 30 with foot pedals 31 operable by the operator. As the platform is moved down a ramp 32 by cylinder and piston 33 the level of a platform 34, on which the operator stands is gradually lowered to floor level. Return movement of the platform to the starting position is effected at a much higher speed by a separate cylinder and piston (not shown) controlled by the foot of the operator. The foot pedals or switches 31 are arranged whereby the operator can control the backward and forward movement of the arms 21, and the opening and closing movement of the leg spreader. The platform moves parallel to and in unison with the line carrying the carcasses and is synchronized with the speed of the line.

What I claim is:
1. A power driven saw installation including
   a saw having a frame and a longitudinal blade mounted for substantially horizontal cutting movement in said frame, said saw being mounted for movement in a vertical plane,
   motor means on one end of said saw for driving said blade,
   hoist means connected to said one end of said saw for raising and lowering said saw, and
   control means on the other end of said saw for controlling said motor means and said hoist means.

2. A saw according to claim 1 including a bar projecting from said other end, said control means being mounted on said bar whereby control of said saw can be effected by use of said bar.

3. A saw according to claim 2 including an adjustable counterweight and fluid cylinder means whereby upward movement of the saw may be controlled.

4. A saw according to claim 3 including two switches each mounted in one end of said bar, one of said switches being useful to start and stop the motion of said blade, and the other of said switches being useful to control said cylinder, and wherein said adjustable counterweight varies the weight ratio on said blade from a few ounces to more than 60 pounds.

5. A saw according to claim 2 wherein said bar projects from both sides of said saw frame, and including an electric motor disposed at said one end, switch means mounted on each projection of said bar, one of said switch means controlling the movement of said blade and the other of said switch means controlling said hoist means to effect vertical movement of said saw, and said saw being suspended at said one end by at least one steel cable.

6. A power operated sawing installation according to claim 1 including a framework having a base, a pillar and a crossbar, a balancer spring and an adjustable power operated hoist mounted on said framework, means suspending said one end of said saw from said power operated hoist, and said spring being operable to assist in returning said saw to its upper position.

7. A power operated saw installation according to claim 1 including a horizontal frame for supporting said saw, and means for controlling backward and forward motion of said frame for positioning said saw in a selected location.

8. A power operated saw assembly according to claim 7 wherein carcasses are moved in a predetermined line of travel and a portion of said horizontal frame may extend over the aitchbone of a carcass and further including a powered pneumatic spreader adapted to spread the hind shanks of the carcass to facilitate the parting of same, said horizontal frame also acting as a carrier on which the entire assembly may travel parallel with the line along which the carcass is moved.

9. A saw assembly according to claim 8 further including a powered mobile platform, said platform being synchronized with the speed of the line on which the carcasses are suspended and being provided with suitable remote control switches which control backward and forward movement of the horizontal frame and the opening and closing of said spreader.

10. A saw assembly according to claim 9 wherein said platform moves parallel to and in unison with the motion of said carcasses and wherein said platform is gradually lowered to floor level and made to return to a starting position and the cycle then repeated.

11. A saw according to claim 1 wherein three cables suspend said one end of said saw, two of said cables being provided for the rise and fall control of said saw and the other of said cables being provided as a safety follower cable which comes into action on failure of either of said first two cables, to prevent an uncontrolled fall of said saw.

12. A power operated saw assembly according to claim 1 including a horizontal frame supporting a balancer, a piston and pulleys adapted to slide backwards, forwards and sideways, so that said saw is supported by said frame and can be placed in any selected location.

References Cited

UNITED STATES PATENTS

| | | | |
|---|---|---|---|
| 1,107,405 | 8/1914 | Brooks | 143—68 |
| 1,119,524 | 12/1914 | Morris et al. | 143—68 |
| 1,271,909 | 7/1918 | Karhan et al. | 17—23 |
| 1,553,601 | 9/1925 | Easton. | |
| 1,752,257 | 3/1930 | Harrington | 143—68 |
| 2,789,310 | 4/1957 | Soss | 17—23 |
| 3,095,602 | 7/1963 | Köttner | 17—23 |

LUCIE H. LAUDENSLAGER, Primary Examiner

U.S. Cl. X.R.

43—68